United States Patent
Keil et al.

(10) Patent No.: US 11,760,060 B2
(45) Date of Patent: Sep. 19, 2023

(54) PLANAR BODY COMPONENT FOR MOTOR VEHICLES COMPOSED OF FIBER COMPOSITE MATERIAL

(71) Applicant: Bayerische Motoren Werke Aktiengesellschaft, Munich (DE)

(72) Inventors: Cornelius Johan Kalle Keil, Goslar (DE); Horst-Arno Fuchs, Starnberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 305 days.

(21) Appl. No.: 15/892,757

(22) Filed: Feb. 9, 2018

(65) Prior Publication Data

US 2018/0162096 A1 Jun. 14, 2018

Related U.S. Application Data

(63) Continuation of application No. PCT/EP2016/069372, filed on Aug. 16, 2016.

(30) Foreign Application Priority Data

Oct. 2, 2015 (DE) ...................... 10 2015 219 107.9

(51) Int. Cl.
*B32B 7/06* (2019.01)
*B32B 7/05* (2019.01)
(Continued)

(52) U.S. Cl.
CPC ................ *B32B 7/06* (2013.01); *B32B 5/024* (2013.01); *B32B 5/26* (2013.01); *B32B 7/05* (2019.01);
(Continued)

(58) Field of Classification Search
CPC ... B32B 7/06; B32B 2605/08; B32B 2307/56; B32B 2605/00; B32B 2307/558; B32B 7/05; B32B 2307/746
See application file for complete search history.

(56) References Cited

U.S. PATENT DOCUMENTS

| | | | |
|---|---|---|---|
| 4,403,012 A * | 9/1983 | Harpell | B32B 27/32 264/257 |
| 5,935,881 A * | 8/1999 | Abiru | D03D 15/00 28/282 |

(Continued)

FOREIGN PATENT DOCUMENTS

| | | |
|---|---|---|
| CN | 101421103 A | 4/2009 |
| CN | 104294616 A | 1/2015 |

(Continued)

OTHER PUBLICATIONS

Machine Translation of DE102009014973 (Year: 2010).*

(Continued)

*Primary Examiner* — Peter Y Choi
*Assistant Examiner* — Jenna N Chandhok
(74) *Attorney, Agent, or Firm* — Crowell & Moring LLP

(57) ABSTRACT

A planar body component for motor vehicles is designed as a fiber composite laminate having a cured main laminate of fiber-reinforced plastic and an additional fiber layer, which is glued to the main laminate and can be decoupled from the main laminate in some sections when force is applied to the planar body component. The additional fiber layer is formed of a non-ductile, dry fiber textile.

1 Claim, 1 Drawing Sheet

(51) Int. Cl.
　　　B32B 7/12　　　(2006.01)
　　　B32B 5/26　　　(2006.01)
　　　B32B 5/02　　　(2006.01)
　　　B32B 27/12　　(2006.01)
　　　B32B 27/20　　(2006.01)
　　　B32B 27/38　　(2006.01)

(52) U.S. Cl.
　　　CPC ............... *B32B 7/12* (2013.01); *B32B 27/12* (2013.01); *B32B 27/20* (2013.01); *B32B 27/38* (2013.01); *B32B 2255/02* (2013.01); *B32B 2255/26* (2013.01); *B32B 2260/021* (2013.01); *B32B 2260/046* (2013.01); *B32B 2262/0253* (2013.01); *B32B 2262/0269* (2013.01); *B32B 2262/101* (2013.01); *B32B 2262/106* (2013.01); *B32B 2307/558* (2013.01); *B32B 2307/56* (2013.01); *B32B 2307/746* (2013.01); *B32B 2605/00* (2013.01); *B32B 2605/08* (2013.01)

(56) References Cited

U.S. PATENT DOCUMENTS

| | | |
|---|---|---|
| 2007/0257518 A1 | 11/2007 | Matsushima et al. |
| 2010/0159168 A1 | 6/2010 | Wienke et al. |
| 2012/0225228 A1 | 9/2012 | Barth et al. |

FOREIGN PATENT DOCUMENTS

| | | |
|---|---|---|
| DE | 40 02 062 A1 | 7/1991 |
| DE | 39 34 555 C2 | 8/1992 |
| DE | 10 2004 042 282 B4 | 2/2009 |
| DE | 10 2008 036 175 A1 | 2/2010 |
| DE | 10 2009 014 973 A1 | 9/2010 |
| DE | 10 2011 107 512 A1 | 1/2013 |
| EP | 1 714 856 A1 | 10/2006 |

OTHER PUBLICATIONS

Machine Translation of DE102008036175 (Year: 2010).*
International Search Report (PCT/ISA/210) issued in PCT Application No. PCT/EP2016/069372 dated Nov. 16, 2016 with English translation (five pages).
German-language Search Report issued in counterpart German Application No. 10 2015 219 107.9 dated Jun. 30, 2016 with partial English translation (12 pages).
English translation of Chinese Office Action issued in counterpart Chinese Application No. 201680035443.1 dated Feb. 20, 2019 (seven (7) pages).
English translation of document C7 (Adana, "Wellington Sears Handbook of Industrial Textiles", Sep. 30, 2000, p. 217, three pages) previously filed on Nov. 8, 2019 (three pages).
English translation of document C8 (Qiying, "Fuel Saving Management and Fuel Saving Technology", Dec. 21, 1989, pp. 235-236, four pages) previously filed on Nov. 8, 2019 (six pages).
Chung, "Composite Materials, Science and Applications", Apr. 3, 2010, p. 61, XP055317288.
German-language Written Opinion (PCT/ISA/237) issued in PCT Application No. PCT/EP2016/069372 dated Nov. 16, 2016 with English translation (14 pages).
Chinese-language Office Action issued in counterpart Chinese Application No. 201680035443.1 dated Sep. 10, 2019 with English translation (13 pages).
Adana, "Wellington Sears Handbook of Industrial Textiles", Sep. 30, 2000, p. 217, three pages.
Qiying, "Fuel Saving Management and Fuel Saving Technology", Dec. 21, 1989, pp. 235-236, four pages.
Chinese Office Action issued in Chinese application No. 201680035443.1 dated Mar. 4, 2020, with English translation (Fourteen (14) pages).

* cited by examiner

PLANAR BODY COMPONENT FOR MOTOR VEHICLES COMPOSED OF FIBER COMPOSITE MATERIAL

CROSS REFERENCE TO RELATED APPLICATIONS

This application is a continuation of PCT International Application No. PCT/EP2016/069372, filed Aug. 16, 2016, which claims priority under 35 U.S.C. § 119 from German Patent Application No. 10 2015 219 107.9, filed Oct. 2, 2015, the entire disclosures of which are herein expressly incorporated by reference.

BACKGROUND AND SUMMARY OF THE INVENTION

The invention relates to a planar body component for motor vehicles, configured as a fiber composite laminate having a main laminate from a fiber reinforced plastics material, and having an additional fibrous layer that is adhesively bonded to the main laminate and, in the case of an application of force on the planar body component, is decouplable from the main laminate. The additional fibrous layer is formed by a fibrous textile.

In the case of fiber-composite laminates for body components as are included in the prior art, fractures can be formed in the case of an application of high force, for example in the case of an accident. This fracture formation results in a delamination of the different laminate layers, on account of which splinters, which represent a risk to passengers, are created. The material installed, usually carbon fibers, is not sufficiently ductile in order for the structure to be preserved and for a fracture formation to be prevented, whereas the progression of the fracture by virtue of the textile structure takes place at a significantly higher resistance than is the case with comparable sheet metal body panels.

Solutions in which individual layers from a fiber-reinforced plastics material are employed as a protective layer or as an anti-splinter protection, for example in the cases of aircraft engines or in motorsports, are known from the prior art. It is also known for additional elastic layers which expand in the case of impact and are intended to absorb splinters, but which do not contribute toward the structural integrity of the component, to be applied to the main laminate.

As the documented prior art, documents DE 3934555 C2, DE 4002062 A, DE 102004042282 B4, DE 102011107512 A, and DE 102008036175A are in the relevant technical field.

Against this background, it is an object of the invention to provide a material system based on fiber-composite materials for the use on planar body components that are prone to intrusion and impact. Herein, the following properties of laminates in terms of structural integrity and splintering behavior and tightness are to be improved. Additionally, it is an intention to guarantee an advantage in terms of weight in relation to a comparable steel or aluminum structure, respectively.

These and other objects are achieved according to the invention by a planar body component for motor vehicles, wherein the planar body component is configured as a fiber composite laminate having a cured main laminate of fiber reinforced plastics material, in particular an epoxy plastics material, and having an additional fibrous layer that is adhesively bonded to the main laminate and, in the case of an application of force on the planar body component, is decouplable from the main laminate. The additional fibrous layer is formed by a non-ductile, dry woven fibrous fabric. In particular, a cured woven fibrous fabric which is not impregnated with resin or plastics material is defined as a dry woven fibrous fabric.

The first solution variant according to the invention is a low-shear linkage between the additional fibrous layer to the main laminate. On account of the gradual force profile from the surrounding main laminate into the additional fibrous layer, a comparatively long fibrous portion is stressed, on account of which the deformation capability of the planar body component is increased. The additional fibrous layer herein can be used on one side as well as on both sides. In body applications it is advantageous in order for splinters or fracture edges in the interior, respectively, to be avoided, that the additional fibrous layer is disposed on the main laminate on the side that faces away from a potential impact, that is to say on the side that points toward the vehicle interior, such that the flow of force is directable onto the additional fibrous layer.

The non-ductile, dry fibrous textile of the additional fibrous layer does not form any elastic resilience as a ductile layer that is downstream of the main laminate and that is to some extent known from the prior art, but by using a soft adhesive having a low shear modulus or a low shear strength respectively, enables individual fibers of the woven fabric to slide to the impact point. The woven fabric structure herein is modified by individual fibers that are drawn in the direction of the impact. The additional fibrous layer forms a fibrous compression above the intrusion point and an orientation of the fibers in the direction of traction or intrusion, respectively, and consequently a network effect. With the network effect, the force that is introduced by an impact is not absorbed by elastic properties but in the surrounding region is transmitted back to the main laminate (action equals reaction).

An adhesive film based on unsaturated polyester or polyurethane is advantageously used as an adhesive for linking the additional fibrous layer in low shear manner to the main laminate. Furthermore, an embodiment in which the adhesive based on unsaturated polyester or polyurethane has a thickness of 40 to 60% of the layer thickness of the additional fibrous layer is advantageous. The thickness of the adhesive contributes toward the relative mobility of the additional fibrous layer in relation to the main laminate.

In an alternative embodiment, the additional fibrous layer by use of a highly viscous epoxy adhesive is adhesively bonded to the main laminate at points, wherein adhesive-free areas are provided between adhesive points such that the additional fibrous layer is only partially fastened to the main laminate. Adhesive-free areas can be achieved, for example, in that the adhesive that has been applied is spread using a doctor blade so as to form a checkerboard pattern. Partial linking in the case of an impact permits the failure of the adhesive points directly at the breaking point of the main laminate. By way of the flow of force via remote linking points, a comparatively long fibrous portion of the additional fibrous layer can be effective, on account of which a higher absolute deformation capability is achieved. In the case of an impact and a failure of the main laminate, the partial adhesive points, which upon curing are brittle, break and permit a relative movement of individual fibers or fiber bundles of the additional fibrous layer in relation to the main laminate. On account of the intrusion, fibers of the additional fibrous layer are drawn along the main laminate toward the intrusion point and in the direction of intrusion. The epoxy adhesive herein preferably has a thickness of 80 to 120% of the layer thickness of the additional fibrous layer.

Carbon fibers are preferably used for the fibrous material for the planar body component. Alternatively or additionally, other fibers such as, for example aramid fibers, basalt fibers, or glass fibers can also be used.

The additional fibrous layer advantageously is particularly effective with a thickness of 15 to 35% of the overall thickness of the planar body component.

In a further alternative embodiment, the planar body component for motor vehicles is configured as a fiber-composite laminate having a main laminate from a carbon fiber-reinforced plastics material, in particular an epoxy plastics material, and having an additional fibrous layer which, by way of a thermosetting matrix, is laminated to the main laminate and, in the case of an application of force on the planar body component, is in portions decouplable from the main laminate. The additional fibrous layer is formed from a woven fibrous fabric from a thermoplastic material. For example, laminating can be performed by the RTM method. According to the invention the additional fibrous layer is formed from a fibrous textile from a thermoplastic material, preferably polypropylene, which is chemically incompatible with the thermosetting matrix of the main laminate and thus adheres very poorly. In the event of an impact, the matrix cannot retain the fibers of the additional fibrous layer on the main laminate such that said fibers perform a relative movement in relation to the main laminate toward the impact point and in the direction of the intrusion. Herein, there are practically only friction forces that act in the flow of force toward the impact point.

It is provided according to the invention that the additional fibrous layer from thermoplastic material has a thickness of 4 to 10% of the overall thickness of the planar body component.

In order for the relative movement to be facilitated and for the friction forces to be reduced, the additional fibrous layer in an exemplary embodiment is coated with a friction-reducing coating, in particular polytetrafluoroethylene (PTFE).

Other objects, advantages and novel features of the present invention will become apparent from the following detailed description of one or more preferred embodiments when considered in conjunction with the accompanying drawings.

BRIEF DESCRIPTION OF THE DRAWINGS

The figures, by way of example, are schematic and serve for the better understanding of the invention. In all views, the same reference signs refer to the same parts.

DETAILED DESCRIPTION OF THE DRAWINGS

Figures 1A, 1B:
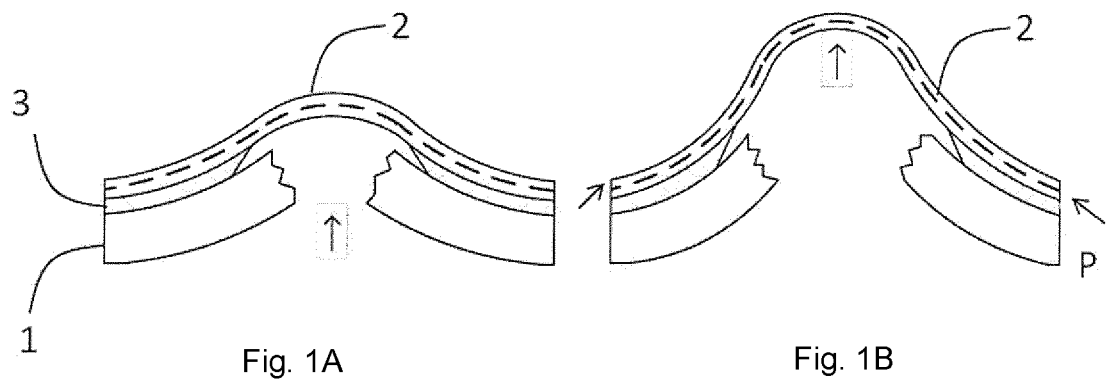
FIGS. 1A and 1B are schematic illustrations of low shear linkage of the additional fibrous layer, with the behavior in the case of an intrusion.

A planar body component as the fiber-composite laminate is shown in FIGS. 1A and 1B, said planar body component having a main laminate 1 that is produced by the RTM method. The component is, made from, for example, a carbon fiber-reinforced epoxy plastics material having a thickness of 2 mm and an additional fibrous layer 2 that is adhesively bonded to the main laminate 1 and is formed from a non-ductile, dry woven fibrous fabric, for example a 12 k carbon fiber woven body fabric having a thickness of 1 mm. The additional fibrous layer 2 is adhesively bonded by use of an adhesive film 3 based on polyurethane to the main laminate 1, and has a thickness of 0.5 mm.

The case of an impact having a main laminate 1 that is broken in a punctiform manner is illustrated in FIG. 1A. FIG. 1B shows the subsequent movement of individual fibers of the additional fibrous layer 2 in the direction of the arrow P within the woven fabric of the additional fibrous layer 2 in relation to the main laminate 1. After the main laminate 1 has broken, individual fibers of the additional fibrous layer are drawn in the direction of the breaking point, in a manner parallel with the main laminate, and at the breaking point in the direction of the intrusion, in a manner substantially perpendicular to the main laminate 1. The relative movement is implemented by the low-shear linkage by way of a polyurethane adhesive.

Figures 2A, 2B:
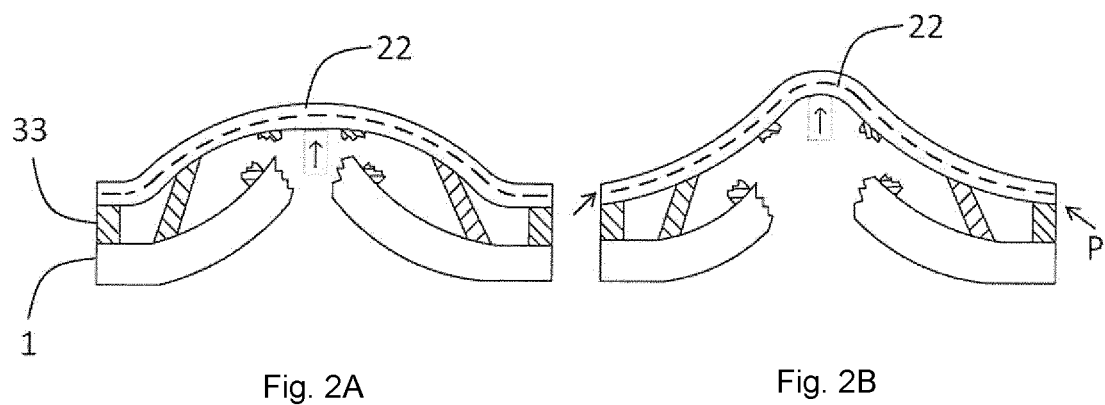
FIGS. 2A and 2B are schematic illustrations of a partial linkage of the additional fibrous layer, with the behavior in the case of an intrusion.

FIGS. 2A and 2B show the same case as in FIGS. 1A and 1B, however, the additional fibrous layer 22 is adhesively bonded in only a partial manner, that is to say at specific points on the main laminate 1. An epoxy adhesive 33, which in the case of the impact disintegrates at the heavily stressed adhesive points and enables a relative movement of individual fibers from the woven fibrous fabric of the additional fibrous layer 22 in the direction of the arrow P, is used as an adhesive. The main laminate 1 is identical to that of FIG. 1; the additional fibrous layer 22 is a 12 k aramid plain woven fabric having a thickness of 1 mm, for example.

Figures 3A, 3B:
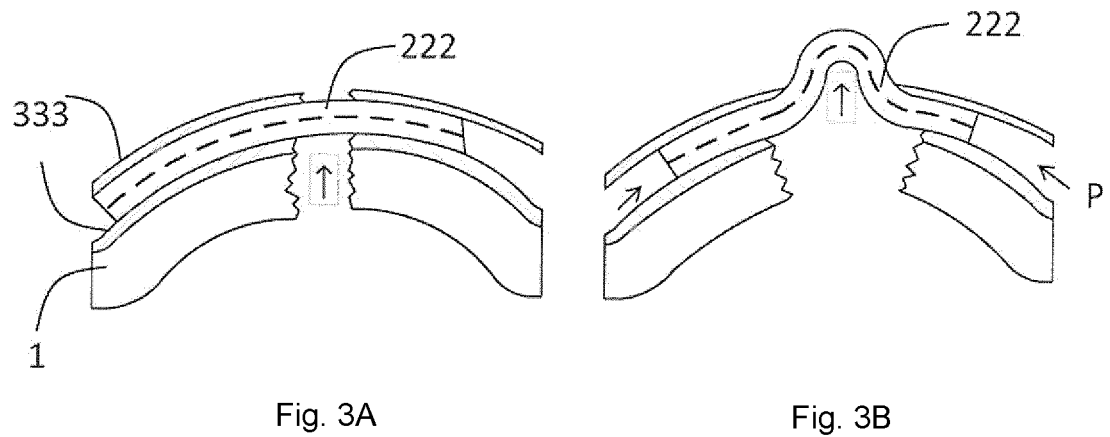
FIGS. 3A and 3B are schematic illustrations of a linkage having a laminated additional fibrous layer, with the behavior in the case of an intrusion.

A schematic illustration of a linkage having an additional fibrous layer 222 that is laminated to the main laminate 1 is shown in FIGS. 3A and 3B. The lamination can be performed in the RTM production process of the main laminate 1, for example. The additional fibrous layer 222 is formed from an oriented 6 k woven fibrous fabric of polypropylene, for example, and is laminated by way of the same matrix 333 as the main laminate 1. Since a thermosetting matrix 333 is employed, there is a minor adhering effect, such that fibers of the additional fibrous layer 222, in the case of the intrusion according to FIG. 3B, perform a relative movement in the direction of the intrusion in relation to the main laminate 1. The movement in the direction of the arrow P is not intended to mean that the entire additional fibrous layer 222 is moved, but only respective fibers.

The invention in terms of the embodiment thereof is not limited to the preferred exemplary embodiments specified above. Rather, a number of variants which make use of the solution illustrated also in the case of embodiments which are of a fundamentally different type are contemplated. For example, woven fabrics having mixed types of fibers can also be used for the additional fibrous layer.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A planar body component for a motor vehicle, comprising:
    a fiber-composite laminate having a main laminate of a carbon fiber-reinforced epoxy plastics material having a thickness of 2 mm and having an additional fibrous layer that is adhesively bonded to the main laminate, wherein the additional fibrous layer is formed of a 12 k carbon fiber woven body fabric having a thickness of 1 mm, the additional fibrous layer is adhesively bonded to the main laminate by an adhesive film of polyurethane or unsaturated polyester such that there is a linkage between the additional fibrous layer and the main laminate, and the adhesive film has a thickness of 40 to 60% of the layer thickness of the additional fiber layer, or wherein the additional fibrous layer is a 12 k aramid plain woven fabric having a thickness of 1 mm, the additional fibrous layer is adhesively bonded to the main laminate by an epoxy adhesive at adhesive points, adhesive-free areas are provided between the adhesive points such that the additional fibrous layer is only partially fastened to the main laminate, and the epoxy adhesive has a thickness of 80 to 120% of the layer thickness of the additional fiber layer, wherein the additional fibrous layer has a thickness of 15 to 35% of an overall thickness of the planar body component, wherein the additional fibrous layer is, at least in sections, decouplable from the main laminate, wherein the additional fibrous layer does not form any elastic resilience as a ductile layer such that when a force is applied to the planar body component the force is not absorbed by elastic properties but is transmitted back to the main laminate, and wherein individual fibers of the additional fibrous layer are moveable within the additional fiber layer in relation to the main laminate such that when the main laminate is broken due to the force, the individual fibers of the additional fibrous layer move within the additional fibrous layer in relation to the main laminate such that the individual fibers are drawn in a direction of a breaking point of the main laminate in a manner parallel with the main laminate and are drawn at the breaking point in a manner substantially perpendicular to the main laminate.

* * * * *